United States Patent
Grün et al.

(10) Patent No.: US 11,280,650 B2
(45) Date of Patent: Mar. 22, 2022

(54) THERMAL FLOWMETER AND METHOD FOR OPERATING A THERMAL FLOWMETER

(71) Applicant: Endress+Hauser Flowtec AG, Reinach (CH)

(72) Inventors: Alexander Grün, Lörrach (DE); Hanno Schultheis, Hermrigen (CH); Sascha Kamber, Epfingen (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 16/979,026

(22) PCT Filed: Feb. 15, 2019

(86) PCT No.: PCT/EP2019/053831
§ 371 (c)(1),
(2) Date: Sep. 8, 2020

(87) PCT Pub. No.: WO2019/170397
PCT Pub. Date: Sep. 12, 2019

(65) Prior Publication Data
US 2021/0055145 A1    Feb. 25, 2021

(30) Foreign Application Priority Data
Mar. 6, 2018    (DE) ..................... 10 2018 105 046.1

(51) Int. Cl.
*G01F 1/69* (2006.01)
*G01F 1/684* (2006.01)

(52) U.S. Cl.
CPC ..................................... *G01F 1/69* (2013.01)

(58) Field of Classification Search
CPC ... G01F 1/68; G01F 15/02; G01F 1/69; G01F 1/684
See application file for complete search history.

(56) References Cited

U.S. PATENT DOCUMENTS

| 6,227,045 B1 | 5/2001 | Morse et al. |
| 2011/0098944 A1 | 4/2011 | Pfau et al. |

FOREIGN PATENT DOCUMENTS

| CN | 1678889 A | 10/2005 |
| CN | 106104222 A | 11/2016 |
| CN | 206756240 U | 12/2017 |
| DE | 102007023840 A1 | 11/2008 |

(Continued)

*Primary Examiner* — David L Singer
*Assistant Examiner* — Anthony W Megna Fuentes
(74) *Attorney, Agent, or Firm* — Mark A. Logan; Endress+Hauser (USA) Holding Inc.

(57) ABSTRACT

Disclosed is a thermal flowmeter for measuring mass flow of a medium in a measuring tube, comprising: a measuring tube having a tube wall and a tube axis; a sensor with four probes, extending from a sensor base into the measuring tube, wherein the probes are adapted to heat medium, to determine its temperature or to influence a flow of the medium; and an electronic circuit, adapted to operate the probes and to create and to provide flow measured values. Each probe has a probe base and a probe active portion, wherein the probe active portion is adapted to heat the medium, to determine the temperature of the medium, and/or to influence a flow of the medium. The probe bases define a rhombus on a surface of the sensor base, wherein the rhombus is defined by geometric centers of cross sections of the probe bases.

9 Claims, 4 Drawing Sheets

(56) References Cited

FOREIGN PATENT DOCUMENTS

| | | |
|---|---|---|
| DE | 102014119223 B3 | 3/2016 |
| DE | 102014114848 A1 | 4/2016 |
| DE | 102014114940 A1 | 4/2016 |
| DE | 102015118123 A1 | 4/2017 |
| DE | 102016121111 B3 | 2/2018 |
| JP | 2004340961 A | 12/2004 |

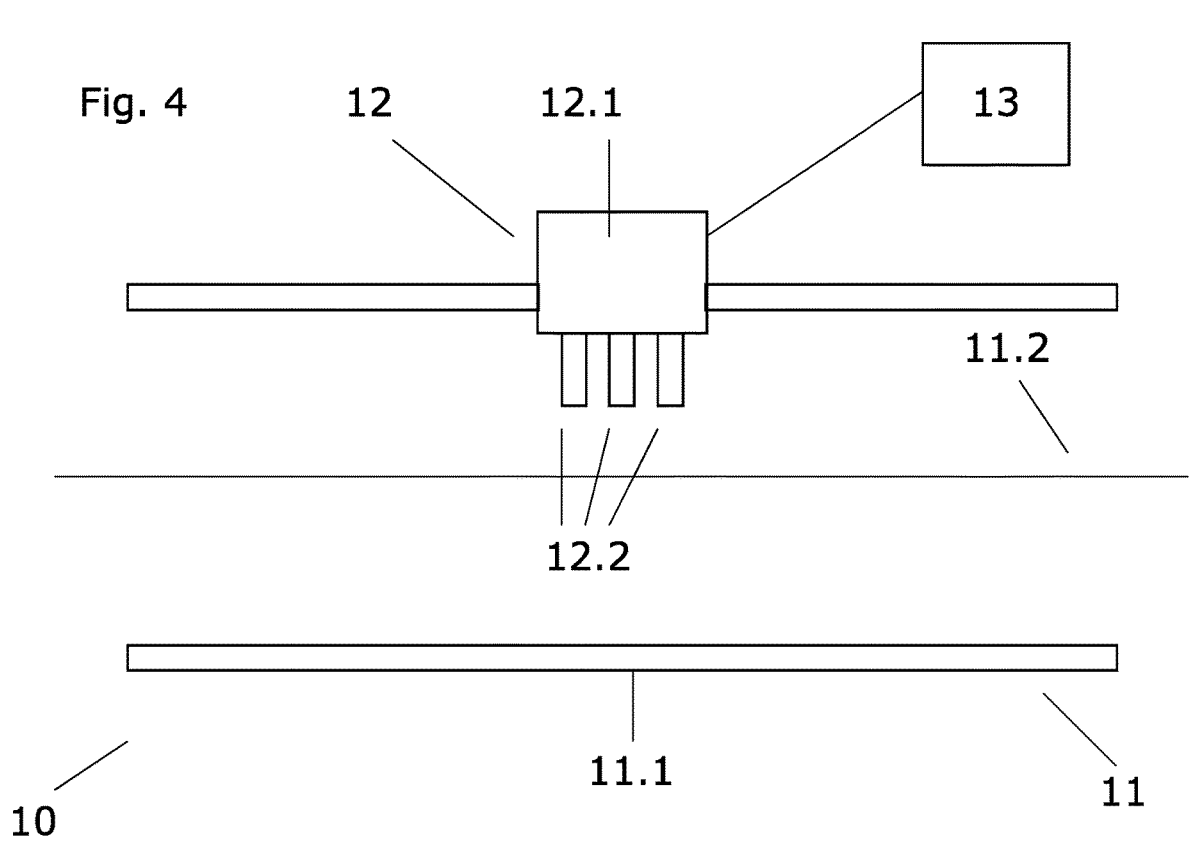

US 11,280,650 B2

THERMAL FLOWMETER AND METHOD FOR OPERATING A THERMAL FLOWMETER

CROSS-REFERENCE TO RELATED APPLICATIONS

The present application is related to and claims the priority benefit of German Patent Application No. 10 2018 105 046.1, filed on Mar. 6, 2018, and International Patent Application No. PCT/EP2019/053831, filed on Feb. 15, 2019, the entire contents of which are incorporated herein by reference.

TECHNICAL FIELD

The invention relates to a thermal flowmeter and to a method for operating a thermal flowmeter.

BACKGROUND

Flow measurement by thermal means is based on the fact that via an energy input via a probe into a medium flowing past the probe or via the temperature of a heated probe located in the medium, deductions can be drawn relative to the mass flow of the medium. However, it is not possible to derive from the energy input, or from the temperature of the probe, in which direction the medium is flowing.

DE102015118123A1 discloses a thermal flowmeter sensor, which extends into a measuring tube of the flowmeter. The sensor has a plurality of probes, which are adapted either for heating the medium and for measuring a probe temperature or for measuring temperature of the medium. Furthermore, a flow resistance is adapted to bring about a direction dependent flow onto a heatable probe, in order to be able to derive from the directional dependence of the flow an unequivocal direction reading for the flow of the medium in the measuring tube. However, it has been found that in the case of small to average flow velocities the flow direction reading is burdened with significant uncertainties.

SUMMARY

An object of the invention is, consequently, to provide a flowmeter, by means of which a reliable flow direction detection of the medium in the measuring tube is enabled.

The object is achieved by a thermal flowmeter as defined in independent claim 1.

A thermal flowmeter of the invention for measuring mass flow of a medium in a measuring tube comprises:

a measuring tube having a measuring tube wall and a measuring tube axis;

a sensor with four probes, which extend from a sensor base into the measuring tube, wherein the probes are adapted to heat the medium, to determine its temperature or to influence a flow of the medium in the measuring tube;

an electronic measuring/operating circuit, which is adapted to operate at least three probes and by means of its operation to create and to provide flow measured values, wherein each probe has a probe base and a probe active portion, wherein the probe base, in each case, is arranged at an end of the corresponding probe facing the sensor base, and wherein the active portion, in each case, is arranged at an end of the corresponding probe far from the sensor base, wherein the probe active portion is adapted to heat the medium, to determine the temperature of the medium and/or to influence a flow of the medium in the measuring tube, wherein the probe bases are column shaped, wherein the probe bases define a rhombus on a surface of the sensor base, wherein the rhombus is defined by geometric centers of cross sections of the probe bases.

Because of this probe arrangement, a high symmetry of the arrangement is achieved as regards flow resistances of the sensor with respect to both possible flow directions of the medium in the measuring tube.

In an embodiment, a first diagonal of the rhombus is in parallel with the measuring tube axis, and a second diagonal of the rhombus lies in a measuring tube cross section.

In an embodiment, a first probe is adapted to measure temperature of the medium, wherein a second probe and a third probe are adapted to heat the medium and to determine their own probe temperatures, wherein the first probe is arranged at a first end of the first diagonal, and wherein the third probe is arranged at a second end of the first diagonal, wherein the second and a fourth probe are arranged at opposite ends of the second diagonal, wherein the fourth probe is adapted to impede a flow portion of the medium between the first probe and the third probe.

The heat transfer of the heating probes to the medium is sufficiently small, so that the first probe registers, independently of the flow direction of the medium in good approximation, the temperature of the medium, uninfluenced by the heat transfer. A first temperature difference between the first probe and the second probe is suitable, in order for a measurement of flow velocity of the medium to be taken into consideration. A second temperature difference between the first probe and the third probe is suitable, in order for a measurement of the flow direction to be taken into consideration. For example, at equal heating powers of the second probe and the third probe at a greater second temperature difference compared with the first temperature difference, this means that the third probe is located downstream from the first probe. For example, however, also the first temperature difference as well as the second temperature difference as a function of time can be utilized, in order to associate flow measured values for the two flow directions with expected temperatures. In such case, the heating power of the third probe can differ from the heating power of the second probe.

In an embodiment, the probe active portion of the fourth probe has along the first diagonal a first width and along the second diagonal a second width, wherein the second width is greater than the first width by a factor of at least 1.1 and, especially, at least 1.2 and preferably at least 1.3, and wherein a geometric center of the probe active portion of the fourth probe is offset in the direction of the second probe.

In this way, a heat flow from the third probe to the first probe can be suppressed at least partially, in order to improve the measurement of flow.

In an embodiment, an outer surface of the probe active portion of the fourth probe is symmetrical about the second diagonal.

In an embodiment, the first probe, the second probe and the third probe all comprise probe sleeves, wherein the flowmeter includes resistance thermometers, wherein a resistance thermometer is arranged in each probe inner space formed by the probe sleeves, which resistance thermometers are adapted to register a temperature or to give off heat.

In an embodiment, the fourth probe is solid.

In an embodiment, a first probe interior angle of the rhombus is less than 90° and, especially, less than 75° and preferably less than 60°.

In this way, a decreased flow resistance of the sensor in the measuring tube and a good flow onto the probes are assured.

In an embodiment, a geometric center of a cross section of the probe base of the fourth probe is separated from a geometric center of a cross section of the probe base of the second probe by a second separation.

wherein a minimum distance between the outer surface of the probe active portion of the fourth probe and an outer surface of the probe active portion of the second probe is less than 30% and, especially, less than 15% and preferably less than 5% of the second distance.

In an embodiment, a first outer diameter of the first probe, the second probe as well as the third probe in their active regions is at least 1 mm and, especially, 1.5 mm and preferably at least 2 mm and/or at most 7 mm and, especially, at most 5 mm and preferably at most 4 mm.

In an embodiment, a geometric center of a cross section of the probe base of the first probe is separated from a geometric center of a cross section of the probe base of the third probe by a first separation, wherein the first separation is at least two first outer diameters.

In an embodiment, cross sections of the first probe, the second probe and as well as the third probe have a round outline at least in regions of the probe active portion.

BRIEF DESCRIPTION OF THE DRAWINGS

Round outlines are easier to manufacture and provide flow resistances, which are independent of flow direction.

The invention will now be described based on schematic examples of embodiments set forth in the appended drawing, the figures of which show as follows:

FIG. 4 shows schematic construction of an example of a thermal flowmeter of the invention.

DETAILED DESCRIPTION

Figure 1:
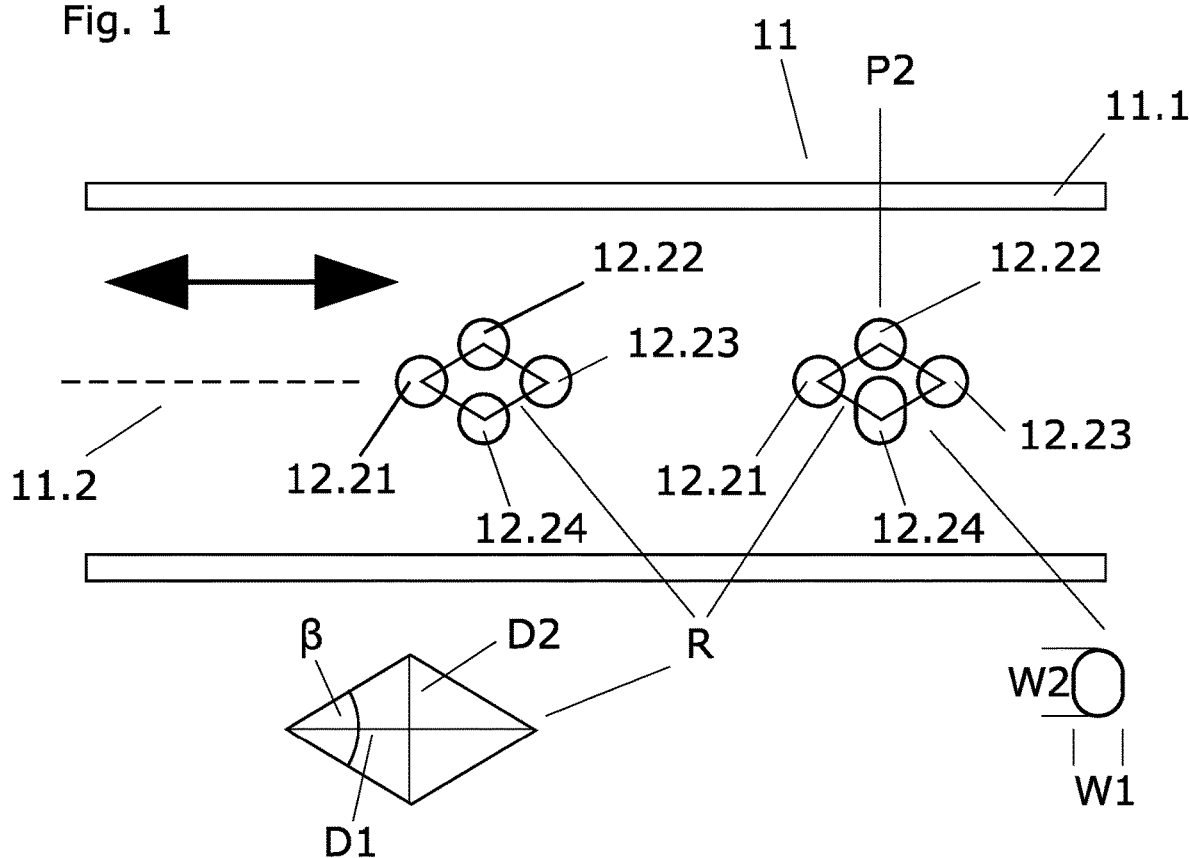
FIG. 1 shows by way of example, active regions of two probe arrangements of the invention of a thermal flowmeter and their orientations in a measuring tube.

FIG. 1 shows active regions of two probe arrangements of the invention in a measuring tube 11 having a measuring tube wall 11.1. Each of the probe arrangements includes a first probe 12.21, a second probe 12.22, a third probe 12.23 and a fourth probe 12.24. The active regions are regions, in which probe active portions A (see FIGS. 2 a), 2 b) and 3)) perform their duties. Each probe active portion is contiguous with its own probe base B, which, in turn, is connected to a sensor base 12.1 (see FIGS. 2 a), 2 b) and 3)). The duty of the probe active portion can be to heat the medium, to determine the temperature of the medium and/or to influence a flow of the medium in the measuring tube.

The probe bases of a probe arrangement define a rhombus, wherein a first diagonal D1 of the rhombus diagonals is directed in parallel with a measuring tube axis 11.2. FIG. 1 shows the orientation of the measuring tube axis. A second diagonal D2 lies in a cross section of the measuring tube. In this way, a high symmetry is achieved, meaning that the flow resistance of the sensor is independent of the flow direction of the medium. An interior angle β associated with the first probe is, in such case, less than 90 degree, so that the probe arrangement has a low flow resistance.

In the case of a first probe arrangement of the invention, the fourth probe 12.24 has in its active region a round outline same as the other probes. In this way, a sensor with the probes can be produced cost-efficiently. In the case of a second probe arrangement of the invention, the fourth probe 12.24 has in its active region a non-round outline, wherein the fourth probe has in parallel with the first diagonal D1 a first width W1 and in parallel with the second diagonal D2 a second width W2, wherein the second width is at least 10% greater than the first width. A geometrical center GC4 (see FIG. 2 b)) of the probe active portion of the fourth probe is offset from a longitudinal axis of the base. In this way, a partial blocking action is produced for a flow of a medium through the measuring tube in the active regions of the probes along the second diagonal D2. In this way, an influence of the third probe 12.23 heating the medium on the first probe can be reduced, and, thus, an accuracy of measurement of the sensor increased. A geometric center of a cross section of the probe base of the fourth probe has, in such case, a second separation from a geometric center of a cross section of the probe base of the second probe. A minimum distance between the outer surface of the probe active portion of the fourth probe OAP to an outer surface of the probe active portion of the second probe is less than 30% and, especially, less than 15% and preferably less than 5% of the second distance.

Figure 2:
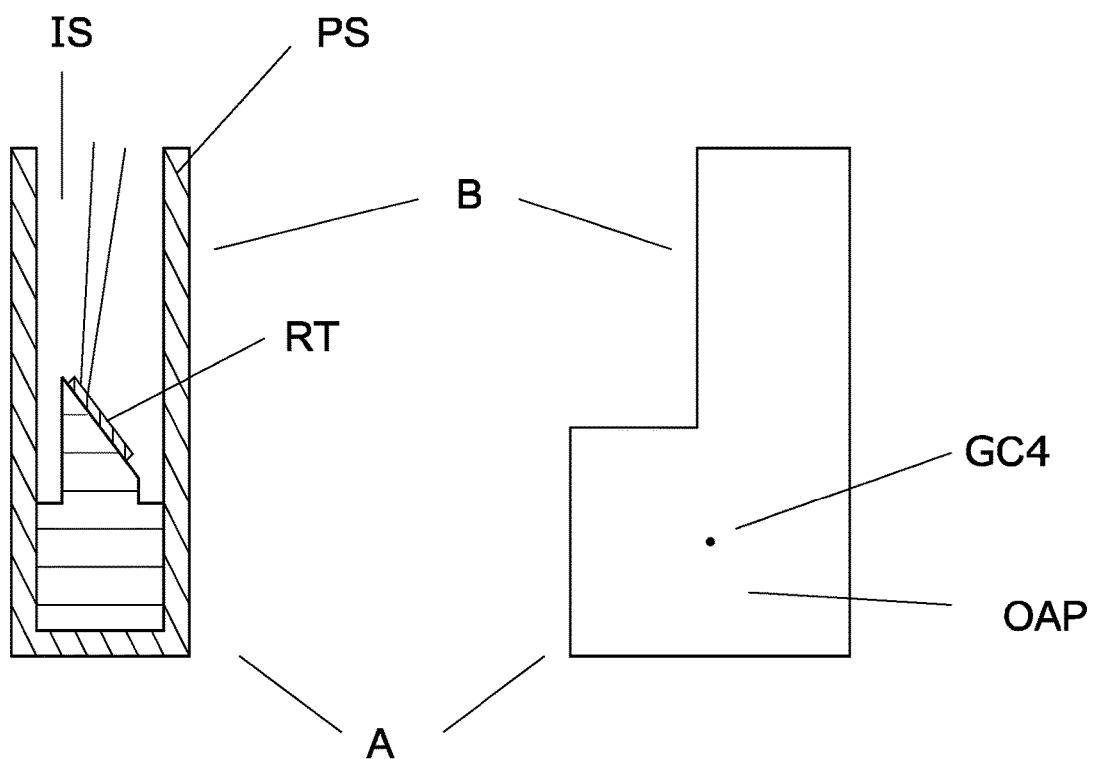
FIG. 2a) shows by way of example, a cross section of a first, second or third probe.
FIG. 2b) shows a side view of an example of a fourth probe.

FIG. 2 a) shows a longitudinal section by way of example of a first, second or third probe, wherein a probe sleeve PS defines an inner space IS of the probe, in which inner space the probe has a resistance thermometer RT. The resistance thermometer is, in such case, coupled via a contact means thermally and mechanically with the probe sleeve. The contact means can be, for example, a casting melted during the manufacture of the probe and then worked after solidification.

FIG. 2 b) shows by way of example a fourth probe in plan view perpendicular to a measuring tube cross section. The fourth probe is broadened in its active region W and, thus, has an enlarged outer surface OAP. A geometrical center of gravity GCG4 of the probe active portion of the fourth probe is, in such case, offset from a longitudinal axis of the base.

Figure 3:
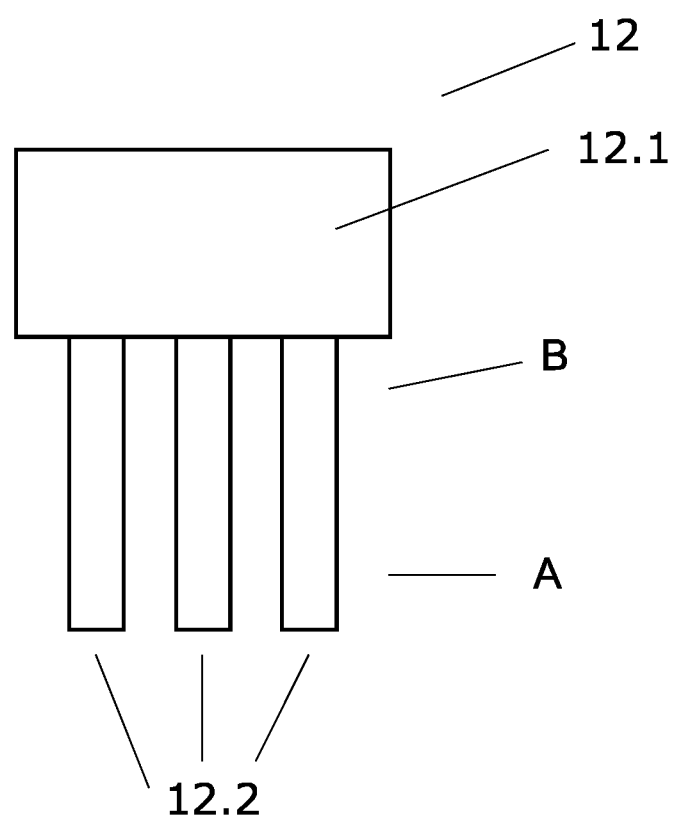
FIG. 3 shows a side view of a sensor of the present disclosure.

FIG. 3 shows a schematic, side view of a sensor 12 of a thermal flowmeter, which sensor has a sensor base 12.1 and probes 12.2, wherein the probes comprise, such as shown in FIGS. 2 a) and b), in each case, a probe base B and a probe active portion A.

FIG. 4 shows a schematic construction of a thermal flowmeter 10 of the invention having a measuring tube 11 with a measuring tube wall 11.1 and a measuring tube axis 11.2, a sensor 12 having a sensor base 12.1 and probes 12.2, and an electronic measuring/operating circuit 13 for operating the sensor and providing flow measured values. The sensor base is, in such case, placed in the measuring tube wall and sealed against escape of media. The active regions of the probes are, in such case, preferably arranged in a flow region of the medium, where a local mass flow differs by less than 10% and, especially, less than 5% and preferably less than 2% from an average value formed over a flow cross section.

The invention claimed is:

1. A thermal flowmeter for measuring mass flow of a medium in a measuring tube, comprising: a measuring tube having a measuring tube wall and a measuring tube axis; a sensor including four probes that extend from a sensor base into the measuring tube, wherein the four probes are configured to heat the medium, to determine the temperature of the medium, or to influence a flow of the medium in the measuring tube; and an electronic measuring/operating circuit configured to operate at least three probes and, by means of its operation, to create and to provide flow measured values, wherein each probe has a probe base and a probe active portion, wherein the probe base, in each case, is arranged at an end of the corresponding probe facing the sensor base, and wherein the probe active portion, in each case, is arranged at an end of the corresponding probe far from the sensor base, wherein the probe active portion is configured to heat the medium, to determine the temperature of the medium, and/or to influence a flow of the medium in the measuring tube, wherein the probe bases are column shaped, wherein the probe bases define a rhombus on a surface of the sensor base, wherein the rhombus is defined by geometric centers of cross sections of the probe bases, wherein a first diagonal of the rhombus is parallel with the measuring tube axis and a second diagonal of the rhombus lies in a measuring tube cross section, wherein a first probe is configured to measure a temperature of the medium, wherein a second probe and a third probe are configured to heat the medium and to determine their own probe temperatures, wherein the first probe is arranged at a first end of the first diagonal, the third probe is arranged at a second end of the first diagonal, and the second and a fourth probes are arranged at opposite ends of the second diagonal, and wherein the fourth probe is configured to impede a flow portion of the medium between the first probe and the third probe.

2. The thermal flowmeter as claimed in claim 1, wherein the probe active portion of the fourth probe has in parallel with the first diagonal a first width and in parallel with the second diagonal a second width, wherein the second width is greater than the first width by a factor of at least 1.1, and wherein a geometric center of the probe active portion of the fourth probe is offset in the direction of the second probe.

3. The thermal flowmeter as claimed in claim 2,
wherein an outer surface of the probe active portion of the fourth probe is symmetrical about the second diagonal.

4. The thermal flowmeter as claimed claim 1,
wherein the first probe, the second probe, and the third probe all include probe sleeves,
wherein the thermal flowmeter includes resistance thermometers, wherein at least one resistance thermometer is arranged in each probe inner space of the first, second, and third probe formed by the probe sleeves, wherein the resistance thermometers are configured to register a temperature or to give off heat.

5. The thermal flowmeter as claimed in claim 1, wherein the fourth probe is solid.

6. The thermal flowmeter as claimed in claim 1, wherein an interior angle of the rhombus at the first probe is less than 90°.

7. The thermal flowmeter as claimed in claim 1,
wherein a geometric center of a cross section of the probe base of the fourth probe is separated from a geometric center of a cross section of the probe base of the second probe by a second separation, and
wherein a minimum distance between an outer surface of the probe active portion of the fourth probe and an outer surface of the probe active portion of the second probe is less than 30% of the second distance.

8. The thermal flowmeter as claimed in claim 1,
wherein a first outer diameter of the first probe, the second probe, and the third probe in their active regions is at least 1 mm and at most 5 mm.

9. The thermal flowmeter as claimed in claim 1, wherein cross sections of the first probe, the second probe, and the third probe have a round outline at least in regions of the probe active portion.

* * * * *